United States Patent [19]
Duncan

[11] 3,971,512
[45] July 27, 1976

[54] SPRAYING APPARATUS

[76] Inventor: David Robertson Duncan, Roundhill Farm, Charlton Musgrove, Wincanton, Somerset, England

[22] Filed: Apr. 21, 1975

[21] Appl. No.: 569,958

[30] Foreign Application Priority Data
Apr. 26, 1974   United Kingdom............... 19237/73

[52] U.S. Cl. ................................. 239/1; 239/423; 239/444; 239/530; 239/549
[51] Int. Cl.² .......................................... B05B 1/14
[58] Field of Search ............ 239/312, 1, 417.5, 413, 239/10, 434, 444, 443, 530, 423, 549

[56] References Cited
UNITED STATES PATENTS

| | | | |
|---|---|---|---|
| 2,668,083 | 2/1954 | Kirchner | 239/444 X |
| 3,066,873 | 12/1962 | Flick et al. | 239/444 X |
| 3,134,545 | 5/1964 | Armond | 239/312 |
| 3,655,131 | 4/1972 | Richterkessing | 239/444 X |
| 3,811,618 | 5/1974 | Gartner | 239/312 |

FOREIGN PATENTS OR APPLICATIONS
657,553   2/1938   Germany ....................... 239/444

*Primary Examiner*—John J. Love
*Attorney, Agent, or Firm*—Young & Thompson

[57] ABSTRACT

A valve unit of a spraying apparatus employs two passageways each provided with an independent manually operated valve and leading respectively to a spray nozzle and a jet nozzle. By providing an interconnecting hole between the inlets of the two passageways and forming the passageways in different bore sizes, different proportions of liquids supplied to the two inlets may be selected as determined by which valve is operated. The unit is very useful for the washing and subsequent spraying of cows' udders with a bacteriacide.

10 Claims, 8 Drawing Figures

SPRAYING APPARATUS

This invention relates to spraying apparatus and is particularly, though not exclusively, concerned with such apparatus for use in the washing of cows' udders prior to milking. Conventionally, the udders of cows are washed with a weak bacteriacide prior to milking to prevent dirt contaminating the milk. Traditionally buckets and cloths were used but this tended to spread infections, particularly Mastitis, from cow to cow and more recently the use of running water through sprays has been introduced so that each cow is washed with clean water. However, this latter system does not allow for a bacteriacide to be incorporated and thus, after washing, it is usual to wash the udder both before and after milking by dipping each teat in a solution of bacteriacide. This system has problems in that the bacteriacide becomes less efficient as each udder is treated and the beakers are easily knocked over, thus requiring frequent refilling.

It is an object of this invention to provide spraying apparatus which can perform both washing and spraying operations and which is capable of producing a spray of treatment chemicals, such as bacteriacides.

Accordingly, this invention provides spraying apparatus comprising a valve unit having inlets to two passageways each leading, via independent manually operable valves to separate outlet nozzles, one of the nozzles being constructed to create a jet of liquid passing therethrough and the other nozzle being constructed to create a spray of liquid passing therethrough.

Ideally the inlet tube associated with the jet nozzle is of larger bore than the other, and advantageously the inlet tube of larger bore is arranged so that it surrounds the other inlet tube along part of its length, thus providing a neat and compact arrangement and enabling connection tubing, similarly arranged one about the other, to be connected readily to the two inlet tubes.

In the preferred embodiment there is an interconnection between the bores of the two inlet tubes. This enables liquids from one inlet tube to be passed into the other inlet tube when one or other of the valves are operated so that mixing of two liquids is automatically achieved. Where one inlet tube surrounds the other the interconnection is formed by a hole in the wall of the inlet tube of smaller bore.

Conveniently the passageways and valve mechanisms are enclosed within a moulded housing which serves to protect the working parts, but it is preferred that the nozzles and end caps of the valves are removable for cleaning purposes.

The invention also provides a spraying method employing the spraying apparatus of this invention as defined hereinbefore, wherein one valve is operated to cause liquid to flow onto an object to be sprayed via the jet nozzle and subsequently the other valve is operated to cause liquid to flow onto the object to be sprayed via the spray nozzle.

Such an apparatus could be used for instance for horticultural purposes where general watering can be achieved via the jet nozzle and a fine spray via the spraying nozzle for feeding or treatment against pests. The invention is, however, readily applicable to the washing and spraying of cows' udders and in such a process the passageway leading to the jet nozzle may be connected to a pressurised water supply and the other passageway connected to a pressurised supply of a liquid disinfectant. If passageways of differing bore sizes are used with an interconnection between the two bores, the disinfectant source being connected to the passageway of smaller bore, when the one valve is operated to produce a jet from the jet nozzle a weak solution of disinfectant will be ejected. This can be used for preliminary washing prior to milking. After washing, the other valve can be operated, which will result in a much stronger solution of disinfectant being sprayed via the spray nozzle and thus reduce the spread of Mastitis or other infections.

The invention may be performed in various ways and one preferred embodiment will now be described, by way of example only, with reference to the accompanying drawings, in which.

Figure 1:
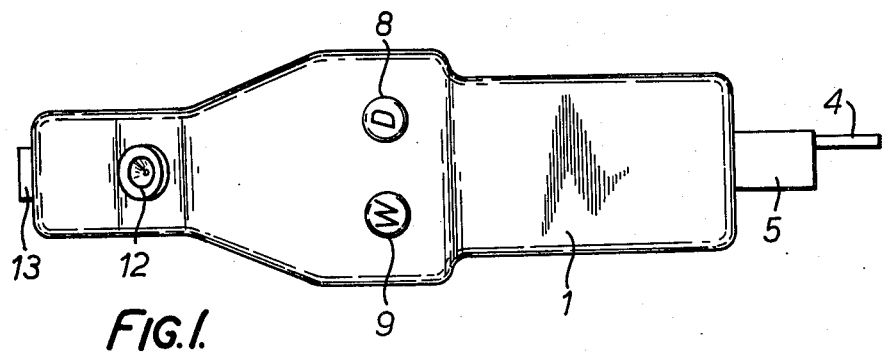
FIG. 1 is a plan view of spraying apparatus constructed in accordance with the invention.
Figure 2:
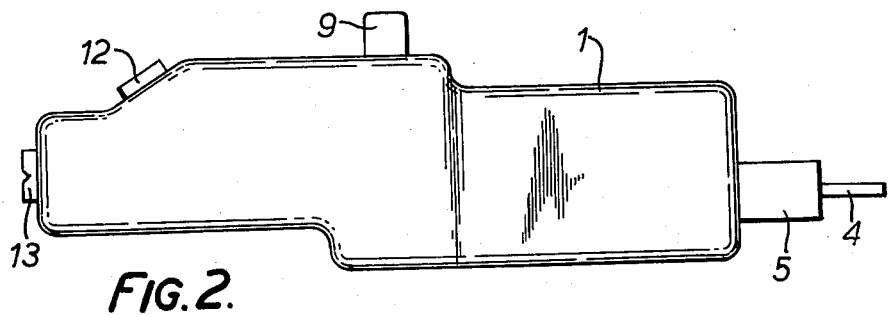
FIG. 2 is a side view of the apparatus.
Figure 4:
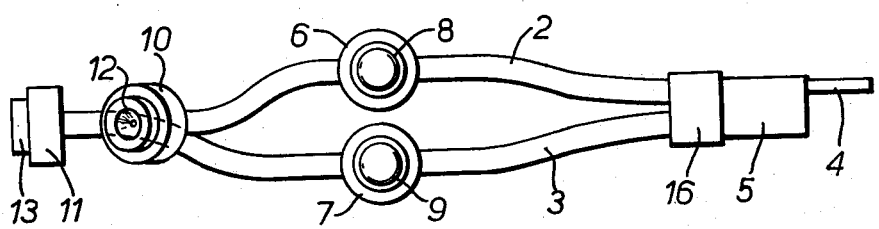
FIG. 4 is a plan view corresponding to FIG. 1 before formation of the moulded housing about the operational parts of the apparatus.
Figure 5:
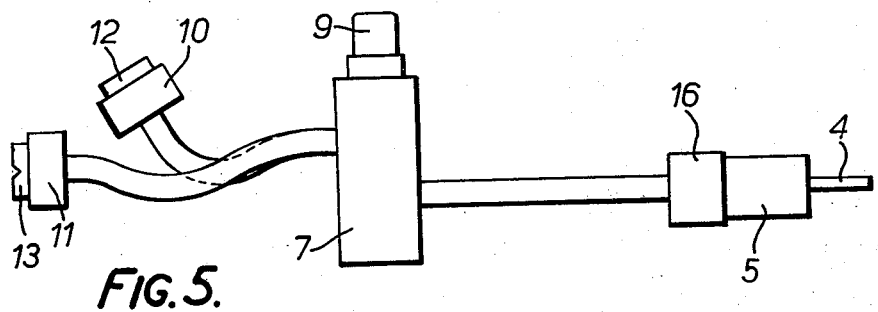
FIG. 5 is a view similar to FIG. 2 of the parts of the apparatus before formation of the moulded housing.
Figure 3:
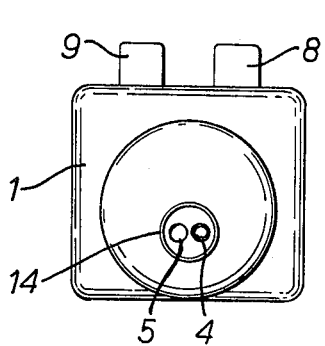
FIG. 3 is an end view of the apparatus.

The apparatus shown in FIGS. 1 to 5 comprises a moulded rubber housing 1 enclosing passageways 2 and 3 leading respectively from inlet pipes 4 and 5. The passageways 2,3 lead respectively to valves 6 and 7, the operating buttons 8 and 9 of which protrude from the top of the casing 1. The passageways then lead from the valves to respective outlet nozzles 10 and 11, the outlets 12,13 of which also project from the housing 1. The outlet 12 of nozzle 10 is constructed so as to produce a fine spray whilst the outlet 13 of nozzle 11 is constructed to produce a strong jet of liquid upon operation of respective valves 6 or 7.

Figure 6:
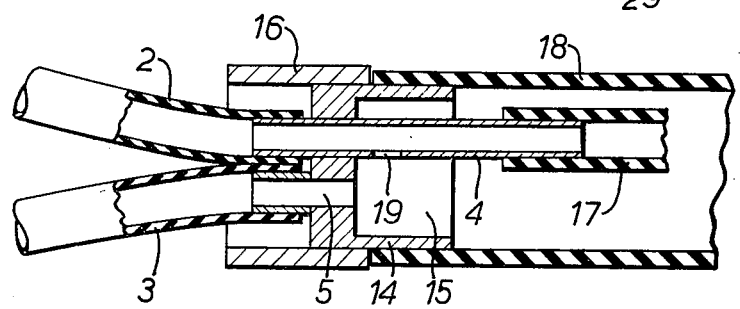
FIG. 6 is a vertical cross-section through the inlet passageways of the apparatus of the preceding figures.

One configuration of the inlet pipes 4 and 5 and therefore interconnection with the passageways 2 and 3 is indicated in FIG. 6. Inlet pipe 4 is a straight tube which leads through a body 14 which is defined the opening 15 of the inlet pipe 5. Rubber hoses are fitted about the ends of the pipes 4 and 5 and form the passageways 2 and 3, the interconnected parts being surrounded by a protective housing 16. Connections to pressurised liquid supply sources are achieved by means of concentric pipes 17,18 which fit respectively about the pipe 4 and the body 14. A hole 19 is formed in the wall of the pipe 4 so that the interior of the pipe 4 connects with the opening 15 leading to the pipe 5 for a purpose which will be explained hereinafter.

Figure 7:
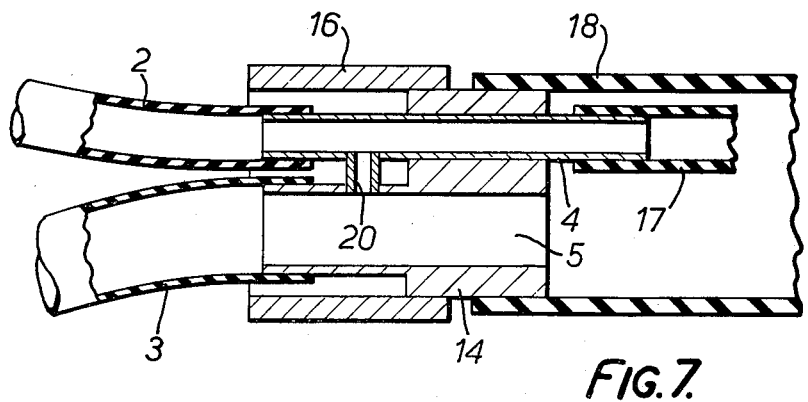
FIG. 7 is a view similar to FIG. 6 showing a modification thereof.

A modification of the apparatus shown in FIG. 6 is shown in FIG. 7. Here the body 14 has a through passage forming the pipe 5 which is separate from the pipe 4 received in a separate passageway in the body 14. Where the pipes 4 and 5 project into the protective housing 16 a short piece of tubing 20 is provided to interconnect the interiors of the two pipes. Connecting hoses 17 and 18 are connected to the pipe 4 and housing 14 in a similar manner to that shown in FIG. 6.

Figure 8:
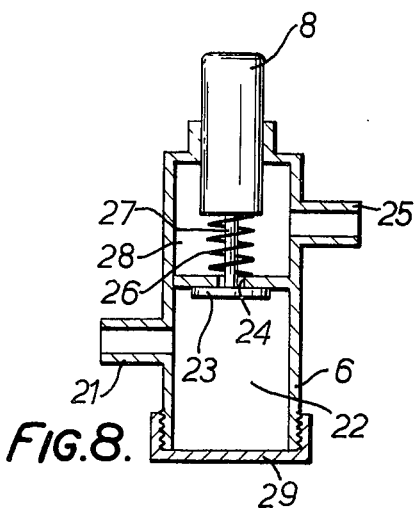
FIG. 8 is a vertical cross-section through one of the valves of the apparatus.

FIG. 8 shows one of the valves 6 which has an inlet 21 leading to an inlet chamber 22. A plate 23 normally closes an opening 24 which allows the inlet chamber 22 to connect with an outlet chamber 28 provided with an outlet passageway 25. The plate 23 is normally held over the opening 24 by the bias of a spring 26 which abuts the button 8 of the valve 6, the button 8 being connected to the plate 23 by a integral rod 27.

In use the jet of liquid may be ejected through the outlet 13 of the nozzle 11 by pressing down the button 9 of the valve 7 to open the passageway 24. This liquid, such as water, is carried through the hose 18 and passes through the tubing 5 to the passageway 3. The other hose 17 is also connected to a pressurised liquid supply and thus some of this liquid will be forced through the hole 19 or tubing 20 into the stream of liquid passing through the tube 5. In the particular embodiment the ration of the respective liquids from hoses 18 and 17 reaching the nozzle 11 will be 30 : 1. When the other valve 6 is operated, a spray of liquid will be produced at the outlet 12 of the nozzle 10 and in the present embodiment the ratio of liquids from hoses 17 and 18 reaching the nozzle 10 will be 1 : 1. Thus, a weak solution of for example a bacteriacide can be produced in a jet from nozzle 11 by operating the valve 7 whilst a strong solution can be produced in the form of a spray from the nozzle 10 by operating the valve 6. The buttons 8 and 9 are advantageously provided with lettering indicating the respective operations and in this case the leters W and D refer to washing with a weak solution and "dipping" with a strong solution.

The apparatus shown in the drawings may be modified in various ways and in particular the interconnection between the two tubes 4 and 5 may be omitted and instead the feed hoses 17 and 18 may be connected to independent supplies of liquids at the required dilution rates. Thus where the apparatus is to be used in a dairy for udder washing a pump unit may be supplied to drive a proportional blender which will mix the liquids in their correct proportions and pump the liquids through the hoses to the spray unit.

In order to provide for adequate cleaning of the valve unit shown in the drawings the nozzles 10 and 11 are removably fitted (such as by a screw thread) onto the ends of the passageways 2 and 3. Also, as can be seen in FIG. 8, the end cap 29 of each valve is removable by screwing to allow access to the interior of the valve for cleaning.

I claim:
1. Spraying apparatus comprising two liquid input lines for independent supply of two liquids, one input line being so disposed that it surrounds the other input line, a valve unit defining two passageways, a first inlet connection interconnecting the one input line with one of the passageways and a second inlet connection interconnecting the other input line with the other passageway, the outer extremities of the first inlet connection being disposed to the outside of the outer extremities of the second inlet connection in the directions normal to the liquid flow axes of the two inlet connections, separate outlet nozzles from each passageway, one of the nozzles being constructed to create a jet for liquid ejected therefrom and the other nozzle being constructed to create a spray for liquid ejected therefrom, and valves independently disposed within each passageway, which are biassed to close the respective passageways and are manually operable selectively to interconnect an input line with a respective outlet nozzle to allow a jet or a spray of liquid, from the respective independent liquid supplies, to be selectively dispensed from the spraying apparatus.

2. Spraying apparatus according to claim 1, wherein said first inlet connection is associated with said jet nozzle and has a bore larger than that of said second inlet connection.

3. Spraying apparatus according to claim 2, wherein the outer extremities of said second inlet connection are surrounded by the bore of said first inlet connection along part of the length of said first inlet connection.

4. Spraying apparatus according to claim 1, wherein there is an interconnection between the two inlet connections.

5. Spraying apparatus according to claim 4, wherein said first inlet connection is associated with said jet nozzle and has a bore larger than that of said second inlet connection, the outer extremities of said second inlet connection are surrounded by the bore of said first inlet connection along part of the length of said first inlet connection and said interconnection is formed by a hole in the wall of said second inlet connection.

6. Spraying apparatus according to claim 1, wherein said passageways and valves are enclosed within a moulded housing.

7. Spraying apparatus according to claim 6, wherein end caps are provided for each of the valves, and said nozzles and said end caps are removable for cleaning purposes.

8. A spraying method employing spraying apparatus comprising two liquid input lines for independent supply of two liquids, one input line being so disposed that it surrounds the other input line, a valve unit defining two passageways, a first inlet connection interconnecting the one input line with one of the passageways and a second inlet connection interconnecting the other input line with the other passageway, the outer extremities of the first inlet connection being disposed to the outside of the outer extremities of the second inlet connection in the directions normal to the liquid flow axes of the two inlet connections, separate outlet nozzles from each passageway, one of the nozzles being constructed to create a jet for liquid ejected therefrom and the other nozzle being constructed to create a spray for liquid ejected therefrom, and valves independently disposed within each passageway, which are biassed to close the respective passageways and are manually operable selectively to interconnect an input line with a respective outlet nozzle to allow a jet or a spray of liquid, from the respective independent liquid supplies, to be selectively dispensed from the spraying apparatus and wherein one of said valves is operated to cause liquid to flow onto an object to be sprayed via said jet nozzle and subsquently the other of said valves is operated to cause liquid to flow onto the object to be sprayed via said spray nozzle.

9. A spraying method according to claim 8, wherein the input line interconnected with said jet nozzle is connected to a pressurised water supply and the input line interconnected with said spray nozzle is connected to a pressurised supply of a liquid disinfectant.

10. A spraying method according to claim 9 utilized for the washing and spraying of cows' udders.

* * * * *